United States Patent [19]
McCann

[11] 3,873,065
[45] Mar. 25, 1975

[54] VEHICLE SAFETY JACKING APPARATUS

[76] Inventor: Robert G. McCann, 855 E. Dolphin Ridge Dr., West Palm Beach, Fla. 33406

[22] Filed: Jan. 21, 1974

[21] Appl. No.: 435,027

[52] U.S. Cl. ............................................... 254/100
[51] Int. Cl. .............................................. B66f 3/36
[58] Field of Search ............... 254/45, 86 R, 98, 100

[56] References Cited
UNITED STATES PATENTS

| | | | |
|---|---|---|---|
| 3,567,182 | 3/1971 | Steele | 254/45 X |
| 3,580,543 | 5/1971 | Hafeli | 254/86 R |

FOREIGN PATENTS OR APPLICATIONS

| | | | |
|---|---|---|---|
| 846,882 | 8/1960 | United Kingdom | 254/100 |
| 1,097,640 | 1/1961 | Germany | 254/100 |

*Primary Examiner*—Othell M. Simpson
*Attorney, Agent, or Firm*—Marden S. Gordon

[57] ABSTRACT

An apparatus for safely jacking up a portion of a vehicle for common maintenance work or to change a tire and the like, the apparatus comprising at least one adaptor bracket secured to the frame of the vehicle at the position at which it is desired to engage the jack thereto, and a screw-type jack having a sleeve adapted for telescoping movement about a threaded shaft in a vertical direction with the bottom end of the shaft pivotally secured to a self-aligning base for adjusting to various types and inclinations of ground surfaces on which the jack is rested, and with the outer cylindrical sleeve of the jack having a collar affixed thereto with a lifting arm pivotally attached at one end to the collar with the other end projecting radially outwardly from the collar and adapted to be engaged in a recess provided therefor in the adaptor bracket for safely elevating the vehicle in a jacking type movement. The pivot axis of the self-aligning base is normal to the axis of the lifting arm such that when in use the jack is self-aligning on the base in a direction toward and away from the vehicle to assure positive engagement of the lifting arm with the bracket.

4 Claims, 5 Drawing Figures

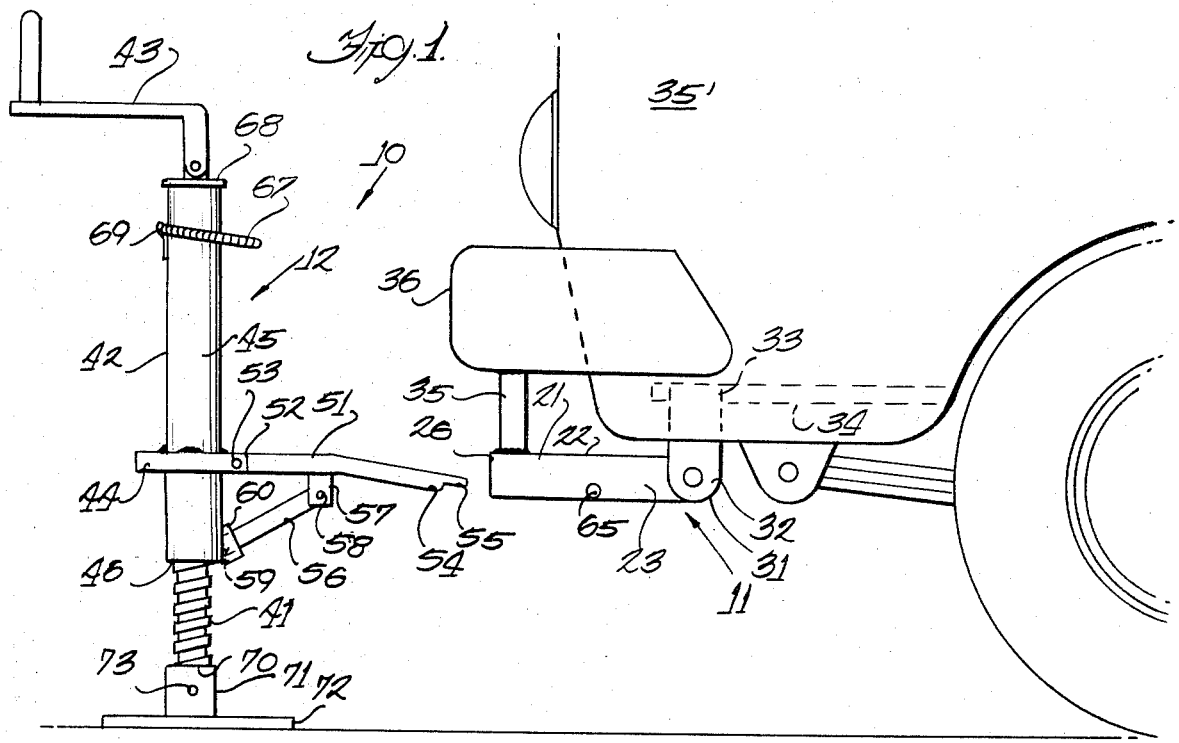
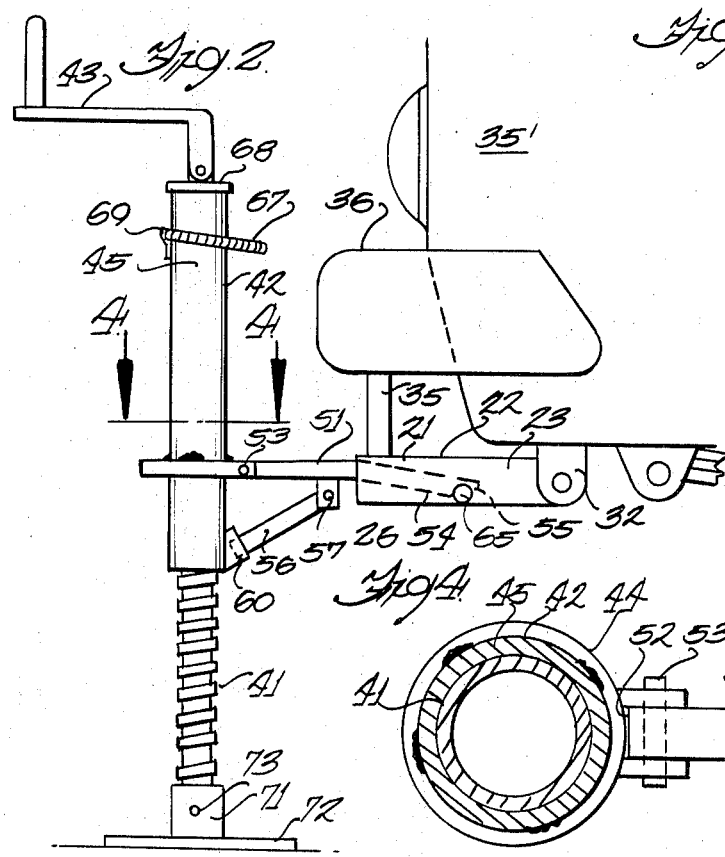
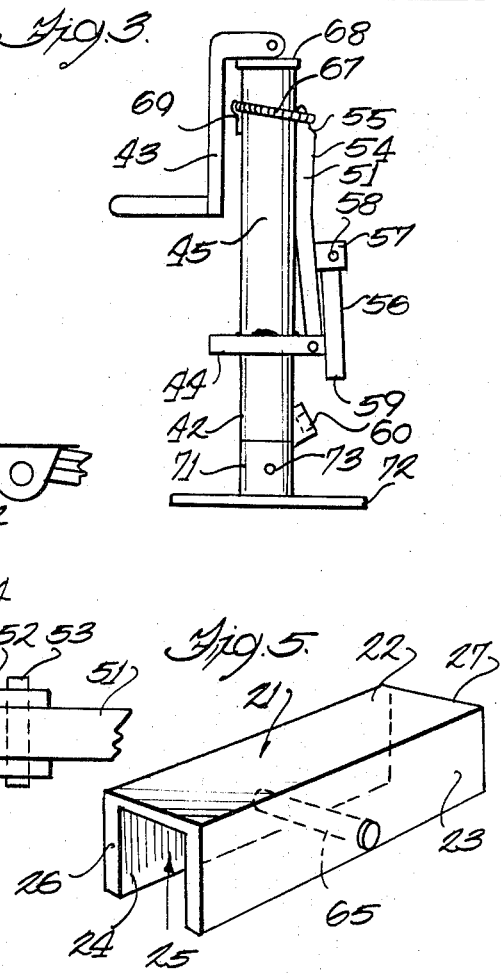

VEHICLE SAFETY JACKING APPARATUS

BACKGROUND OF THE INVENTION

1. Field of the Invention

This invention relates generally to vehicles and jacking systems therefor and more particularly to a novel vehicle safety jacking apparatus for the positive elevating of a portion of a vehicle from the ground for maintenance or repairing a tire in a safe and secure manner as the jack engages an adaptor affixed directly to the frame of the vehicle rather than having to depend on engaging a body portion or bumper portion of the vehicle.

2. Description of the Prior Art

While there are different types and configurations of jacks presently available intended for use with vehicles for the elevating or portions thereof, the most commonly provided jack with most new vehicles manufactured today engages into special openings or contours on the vehicle bumpers for use in the raising of the vehicle from the ground for routine maintenance and tire repair. However, such jacks normally have only minimum engagement with the vehicle bumper so that it is not unusual for the jack to slip therefrom thus dropping the vehicle to the ground and posing a danger to the individual working on the vehicle should the individual be about the car when the same slips from the jack. Further, many jacks provided with vehicles today cannot safely lift the complete weight of the vehicle, especially if the vehicle is of the small truck or van type in that it has been found that engaging the bumper portion of such a van when it is loaded will, in many cases, not effect the lifting of the van without seriously bending or otherwise damaging the bumper.

SUMMARY OF THE INVENTION

The present invention remedies and overcomes the deficiencies and disadvantages of presently available jacking devices by providing a plurality of lifting adaptor brackets which are adapted to be secured directly to the frame of a vehicle at various positions thereon, such as beneath the front and rear bumpers adjacent the opposite wheels or affixed to the frame at each side of the vehicle intermediate the wheels, with the brackets having a channel member associated therewith for securely receiving the projecting end of a lifting arm from a jack such that the elevating force of the jack is transmitted through the lifting arm to the adaptor and directly to the frame of the vehicle with no damage being made to the vehicle body or bumper portions when jacking the same.

A further provision of the present invention provides a self-aligning base pivotally attached to the bottom end of the jack and adapted to self-adjust for slight inclinations or other obstructions on the ground such that the jack assumes a substantially vertical position relative to the vehicle during the jacking operation.

It is a feature of the present invention to provide a vehicle safety jacking apparatus adapted to safely lift and lower a vehicle in a jacking manner without damaging in any way the bumpers or body portions of the vehicle.

A further feature of the present invention provides a vehicle safety jacking apparatus which is adapted for use on all types of vehicles, including automobiles and trucks, and which is utilized in a manner assuring the safe and positive gripping of the vehicle by the jack during the elevating process thus eliminating the hazard of the vehicle slipping from the jack after the vehicle has been properly blocked to prevent rolling thereof.

Other features and advantages of this invention provide for a vehicle safety jacking apparatus which is relatively inexpensive to manufacture due to its simplicity of construction; one which is of a rugged and durable construction and therefore guaranteeable by the manufacturer to withstand many years of intended usage; one which is easy to use and reliable and efficient in operation; one which may, in its entirety, be manufactured and installed as part of the original equipment of the vehicle, or which may be readily attached to the vehicle later as an accessory item with a minimum of time and labor involved for making such attachment; and one which, otherwise, is well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a fragmentary side elevational view of a vehicle having a lifting adaptor bracket secured beneath the front bumper thereof and in position to be engaged by the jack;

FIG. 2 is a view similar to FIG. 1 but with the jack engaging the lifting bracket with the vehicle having been slightly elevated by operation of the jack;

FIG. 3 is a side elevational view of the jack with the lifting arm in its folded storage position;

FIG. 4 is an enlarged cross-sectional view taken along Line 4—4 of FIG. 2; and

FIG. 5 is an enlarged perspective view of the channel portion of the lifting adaptor bracket showing the pin therein which is engaged by the lifting arm of the jack.

DESCRIPTION OF THE PREFERRED EMBODIMENT

Referring now to the drawings in detail there is illustrated a preferred form of a vehicle safety jacking apparatus constructed in accordance with the principles of the present invention and designated generally in its entirety by the reference numeral 10 and which is comprised of a lifting adaptor bracket 11 and a heavy duty screw type jack 12.

The lifting adaptor bracket 11 is provided with an elongated channel member 21 having an inverted U-shaped cross-sectional configuration which includes a horizontal base member 22 and depending vertically downwardly projecting leg portions 23 and 24, the surfaces 22-24 defining therebetween a generally rectangular slot 25. Channel member 21 has a front end 26 and a back end 27. Affixed to at least one of the leg portions 23 or 24 adjacent back end 27 is one end 31 of a support member 32 which projects upwardly therefrom and has its opposite end 33 adapted to be suitably fastened to a portion of the vehicle frame 34 of the vehicle 35, such fastening being by welding, nuts and bolts, or the like. Affixed to the channel member 21 adjacent the front end 26 thereof is a further vertically extending support member 35 which projects upwardly therefrom and is adapted to be affixed to the bottom portion of the vehicle bumper 36 as shown in the drawings.

It is to be understood that a plurality of lifting adaptor brackets 11 are provided and are intended to be affixed about the perimeter of the vehicle 35 at selected locations such that upon engagement of jack 12 with the lifting adaptor bracket 11 the associated portion of the vehicle will be elevated from the ground for purposes of regular maintenance, changing a tire, and the like. For example, a pair of lifting brackets 11 may be provided associated with the front bumper and spaced apart adjacent side wheels of the vehicle, a further pair associated with the rear bumper and spaced apart associated with the adjacent rear wheels of the vehicle, or alternatively, pairs of lifting brackets may be disposed intermediate the wheels on each side of the vehicle and open out of the side of the vehicle to have the jack engaged thereinto. Further, while support member 35 is shown affixed to the bumper 36 in the present drawings, it is to be understood that when the lifting brackets 11 are mounted on the sides of the vehicle between the wheels that such support member 35 is then of a convenient shape and contour to extend from the front end 26 of the channel member 21 to a position to be secured to a portion of the vehicle frame.

The jack 12 is of a heavy duty screw type jack which is comprised of a threaded screw shaft 41, an outer cylindrical tubular sleeve 42 telescopically received on the shaft for reciprocal vertical movement relative thereto between an elevating position and a lowered position, a handle member 43 to effect the rotation of the jack in a manner to raise or lower the sleeve 42, a circular collar member 44 welded to the outer circumferal side surfaces 45 of sleeve 42 adjacent the bottom end 46 of the sleeve, an elongated rectangularly shaped lifting arm 51 having one end 52 attached to a portion of collar 44 by pivot pin 53 with the opposite end 54 projecting radially from the sleeve 45 and provided with a recess 55 in the lower portion thereof, and a brace 56 having one end attached to a bracket 57 by pin 58 which is affixed to the bottom surface of lifting arm 51, the opposite end 59 of the brace adapted to be received in a socket 60 formed integrally with the bottom end 46 of the sleeve 42. In addition, for use with recess 55 of lifting arm 51 there is provided in channel member 21 a hardened steel pin 55 which projects transversely of slot 25 and is spaced inwardly from channel front end 26, this engagement being as generally illustrated in FIG. 2 and serving to define the preferred amount of penetration of the lifting arm 51 into the slot 25 until the recess 55 engages the pin 65.

As seen in FIG. 3, the lifting arm 51 is pivotable about pivot pin 53 with brace 56 slipping out of socket 60 such that the lifting arm is disposed in a storage position adjacent sleeve circumferal side wall surfaces 45 with the brace 56 pivoting to a position substantially adjacent the bottom surface of the lifting arm, this storage position of the lifting arm and brace being retained by a resilient member 67 affixed to sleeve 45 adjacent the top end 68 thereof by means of a clip 69 with the resilient member slipping over the recess portion 55 of end 54 of the lifting arm to retain the lifting arm in the storage position.

To permit the jack to accomodate itself on different types of ground which may be inclined or otherwise at an angle to the vehicle to be lifted, the bottom end 70 of threaded shaft 41 is pivotally attached to flange portion 71 of a base platform 72 by means of pivot pin 73, the pivot pin extending in a direction substantially at right angles to the direction of the lifting arm when it projects from the sleeve member 45 thus permitting the rocking self-aligning movement of the jack 12 relative to the vehicle in a direction toward and away from the vehicle.

After a vehicle has been equipped with the required number of lifting adaptor brackets 11, the operation of the vehicle safety jacking apparatus is as follows: The jack 12 is removed from its storage location, lifting arm 51 is freed from resilient member 67 and pivots about pivot pin 53 until end 59 of brace 56 is engaged in socket 60 such that the lifting arm projects radially outwardly from the sleeve, recess 55 of end portion 54 is axially inserted through channel slot 25 until it engages on the pin 65 at which time the jack is in position for the lifting of the vehicle by the rotation of handle 43 in a manner to telescopically raise sleeve 42 relative to shaft 41, the base 72 being self-aligning about pivot 73 to maintain the jack in a substantially vertical position. As a substantial portion of the lifting arm 51 is engaged in channel slot 25 there is no risk of the vehicle slipping from the jack after the wheels which are still in contact with the ground have been blocked in the standard safety conventional manners. To lower the vehicle to the ground, the above procedure is reversed after which the lifting arm is disengaged from the channel member 21 and is easily pivoted about pivot pin 53 to return to its storage position as held there by resilient member 67.

It is to be appreciated that the vehicle safety jacking apparatus 10 of the present invention permits for the rapid and safe jacking of the vehicle in a manner not damaging in any way the bumper or other body portions of the vehicle and thus permitting a strong jacking force to be applied to the vehicle as such is directed onto the vehicle frame by the lifting adaptor bracket 11, this permitting a van or small truck to be jacked up for changing of a tire or the like even though the van is loaded whereas, if a conventional type of jacking apparatus were utilized, not only would there be a risk of damage as to a vehicle slipping from the jack, but also it would be necessary to completely unload the van or small truck before jacking the same as otherwise serious damage will result to the vehicle bumper or body portion on which the conventional jack is engaged.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. Jacking apparatus intended for use with a vehicle for the safe and positive jacking of the vehicle to an elevated position for performance of maintenance on the vehicle, changing a tire of the vehicle, and the like, the apparatus comprising:

at least one lifting adaptor bracket affixed to the frame of the vehicle and having a front end and a back end, the front end projecting outwardly of the vehicle and defining a recess therein;

a screw type jack having a threaded shaft with a tubular cylindrical sleeve member telescopically received on said shaft for reciprocal movement therealong, a handle operatively attached to the jack to effect the reciprocal movement of the sleeve member;

a self-aligning jack base member affixed to the bottom end of said jack and adapted to engage a supporting surface in a self-aligning manner for support of the jack thereon; and a lifting arm having one end affixed to said jack sleeve member with the opposite end projecting outwardly therefrom and adapted to engage said recess of said lifting adaptor bracket and operable in a manner to elevate the vehicle by means of said bracket when said sleeve member is moved vertically upwardly along said threaded shaft of said jack;

said lifting adaptor bracket comprising an elongated body member having an inverted substantially U-shaped cross-section formed of a horizontal base member and depending vertically downwardly projecting leg portions, said base member and said leg portions defining interiorly thereof the elongated slot forming recess, said body member having a front end and a back end, a hardened steel pin spaced inwardly from said front end a substantial distance and extending intermediate said leg portions, a supporting member having one end affixed to said back end portion of said body member with the opposite end projecting substantially vertically upwardly therefrom and adapted to be secured to a portion of the frame of said vehicle, a second support member having one end affixed to the front end portion of said body member with the opposite end projecting upwardly therefrom and adapted to engage a rigid portion of said vehicle and selected from the portions including the vehicle bumper, the vehicle frame, and the like whereby the front end of said body member is directed outwardly of said vehicle.

2. The apparatus as set forth in claim 1 wherein said sleeve member is provided with an annular collar member affixed thereto and spaced a slight distance upwardly from the bottom end thereof, a pair of flange members affixed to said collar member and projecting radially outwardly therefrom in a direction adapted to be pointed toward said lifting adaptor bracket when the jack is in operative position relative thereto, one end of said lifting arm disposed intermediate said flange arm portions and pivotally connected thereto by a pivot pin extending through the flange portions and lifting arm in a direction normal to the axis of the sleeve member, the opposite end of the lifting arm projecting outwardly therefrom and swingable about said pivot between a storage position disposed adjacent to said sleeve member side wall surfaces and an operative position extending radially outwardly of said sleeve member, a flange member affixed to the bottom surface of said lifting arm, a brace member having one end pivotally affixed to said lifting arm bottom flange with the opposite end projecting away therefrom and pivotable thereabout, a socket member defined on said sleeve member adjacent the bottom end thereof and formed in the plane of movement of said lifting arm, the free end of said brace member adapted to be engaged in said socket member when said lifting arm is in the operative position projecting outwardly of said sleeve member for engagement with said body member slot of said lifting adaptor bracket.

3. The apparatus as set forth in claim 2 wherein the outer end portion of said lifting arm is provided with a recess in the lower lip portion thereof, and wherein said lifting adaptor bracket body member is provided with a hardened steel pin spaced inwardly of said bracket front end and extending transversely between said bracket leg portions, said recess adapted to engage said pin to indicate the proper position of insertion of said lifting arm into said slot preparatory to the lifting of the vehicle by operation of said jack.

4. The apparatus as set forth in claim 3 wherein said self-aligning base member is comprised of a substantially flat platform adapted to be rested on a ground surface or the like, a flange member affixed centrally of said platform and projecting vertically outwardly from the top surface thereof, and said bottom end of said shaft being pivotally connected to said platform base portion by a pivot pin extending through said flange portion and said bottom end shaft portion in a direction normal to the plane of movement of said lifting arm whereby said jack is pivotable relative to said base in a direction toward and away from the vehicle to be elevated.

* * * * *